United States Patent Office 3,219,378
Patented Nov. 23, 1965

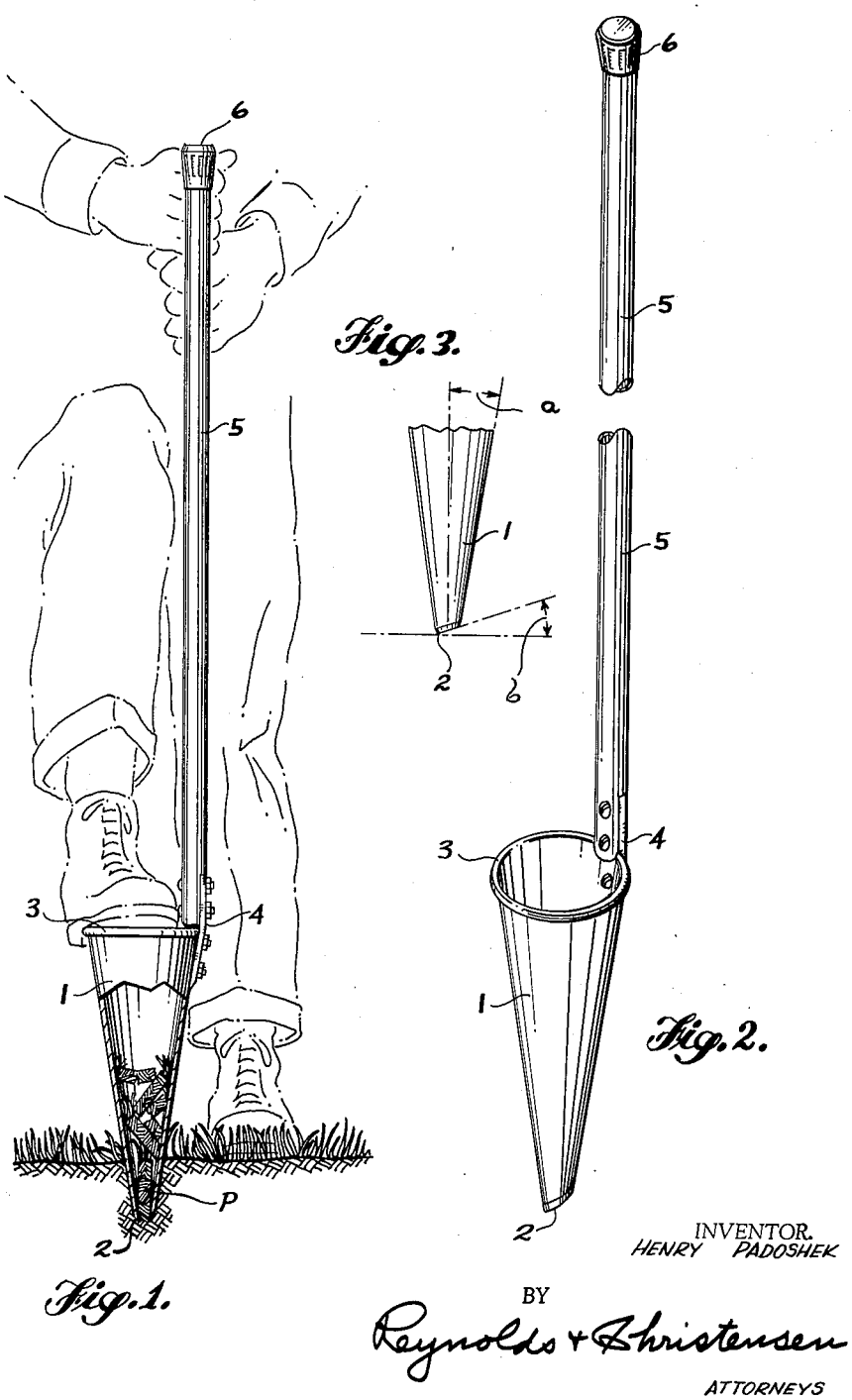

3,219,378
LAWN PERFORATOR AND WEEDER
Henry Padoshek, 240 Okanogan St., Wenatchee, Wash.
Filed Nov. 18, 1963, Ser. No. 324,268
3 Claims. (Cl. 294—50.7)

This invention relates to an improved lawn perforator tool and weed root remover, and has for a broad objective the provision of a low-cost tool of this nature which is efficient for its purpose and easy to manipulate. The invention is herein illustratively described by reference to the presently preferred embodiment thereof; however it will be recognized that certain modifications and changes therein with respect to details may be made without departing from the essential features involved.

In certain soils and regions water from lawn sprinklers does not penetrate properly, to carry moisture and nutrient material to the grass roots. Certain soils require aeration occasionally, and in any soil fertilizer is best supplied when it penetrates to the roots, rather than merely being spread upon the grass and upon the ground surface. For such reasons it is desirable to perforate the soil at rather close spacings, from time to time. Also, it is always desirable to remove moisture and nutrient-sapping weeds from any lawn, and is especially desirable to permit doing so with dispatch at minimum effort.

Lawn perforators are known by the use of which spikes are punched into the soil, but no soil is removed. Any weed roots in the soil remain unchanged. These perforators are not wholly satisfactory, however, since the holes are usually small, and tend to close rapidly even after rocking the spikes back and forth to open up the holes. The compacted soil and sod have elasticity or memory and the holes soon close, so that air and water do not penetrate readily. There are also lawn perforators which remove a small plug of soil and so leave a temporary hole of adequate size, but those known devices are considered to be relatively expensive or awkward to use, and are not readily usable for removing weeds nor are the aeration holes as permanent as is desired.

It is an object of this invention to provide a compact and easily operated lawn perforator of the type that removes a small plug (with or without a weed root), yet because of the taper and length of its frusto-conical head is capable of retaining within it a large number of such plugs before emptying is necessary. This greatly minimizes interruptions of the perforating process in covering a large lawn area and provides a convenient way of accumulating the plugs for ultimate disposal such as in building a compost pile.

In addition, the frusto-conical shape of the perforator head enlarges the holes more greatly near the top by forcing back the sod progressively as the head penetrates the sod. This overcomes the natural tendency for the sod to reclose the holes more quickly at points nearest the surface, especially if the lawn is walked on thereafter. Because of the combined plugging and spreading action, therefore, the holes do not reclose immediately and the soil is more permanently conditioned for deep entry of air, fertilizer and of water.

The frusto-conical shape of the perforator head also permits making it of sheet metal and mounting it on a handle, at a very low cost, with inherently adequate strength and suitable form to permit application of foot pressure upon its upper end to force it into the ground with minimal effort. Such shape also facilitates removal of the plugs with minimal effort and subsequent emptying of its interior of accumulated plugs with great ease.

It is a still further object so to form the entering end of the perforator that it will enter with a minimum of resistance.

A related object is a perforator so formed that the user may sight through and past it quite readily so as to permit accurate placement thereof to remove weed roots in perforating the sod.

With such objects in mind, and others which will appear hereinafter, this invention comprises the lawn perforator shown in a preferred form in the accompanying drawings, described herein, and the novel features whereof are set forth in the claims.

FIGURE 1 is an elevational view of the preferred embodiment of the tool in use, partly broken away.

FIGURE 2 is an isometric view of the tool.

FIGURE 3 is an elevational view of the lower part of the tool head, showing angular relations approximating the preferred optimum.

The perforator includes a cone-shaped perforating head 1, which also constitutes a hopper, supported at the lower end of a handle 5. The hopper 1, preferably of sheet metal that can be quite thin—such as 24 gauge—has an entrance 2 at its lower, smaller end, of the size that the plug is to be, and flares upwardly, usually uniformly, to an open upper end defined by a rolled edge. The entrance at 2 (see FIGURE 3) defines a plane that is inclined at an angle $b$ other than at 90° relative to the axis A of the cone, whereby it slices into the ground when pushed down, and thereby penetrates more easily than if the entrance were square with the axis. The rolled edge 3 strengthens the hopper 1 and provides a bearing surface for the user's foot to press the cone into the soil. The handle 5 is held to one side of the cone at the top by a strap 4. In this location the handle presents minimum interference with use of edge 3 as a footrest. Preferably the connecting strap 4 is fastened to each of the cone and the lower end of the handle by means of bolts, although rivets or other connecting elements may be used instead. The handle 5 is located immediately above and virtually or actually contacting the rolled edge 3, such that any downward pressure exerted on the rubber cap 6 at the upper end of the handle will be assumed directly by the cone with minimum strain on strap 4.

The size and shape of the cone, with relation to the size of the plugs of earth that it removes, are important. The entrance at 2 may be, for example, ⅝ inch in diameter. It may be slightly smaller or larger but this diameter is about optimum for most lawn aeration jobs. Preferably the top opening, at 3, is approximately three inches inside diameter, with a hopper 1 approximately ten inches long and a cone half-angle $a$ of approximately 9°. A perforator head of this size and these proportions is considered to be substantially optimum for most applications. It operates easily to cut and remove the plugs while forming the plug holes in the described manner, yet it affords a large storage capacity for the removed plugs without locating the foot rest edge 3 at a cumbersomely high elevation above ground level. The inclination angle $b$ of the plane of opening 2 relative to a plane normal to the cone's axis is preferably about 15°. Since the cone is ten inches high, and is not intended to penetrate the soil by more than two or two and one-half inches, the hopper has sufficient capacity to hold a substantial number of plugs before it must be emptied. Each plug being cut forces its way into the hopper and in so doing easily lifts the mass of plugs upwardly therein to accommodate it. The new entrant then serves as a valve against pebbles or dirt dropping from the hopper in its erect position.

As the perforator is pressed, by hand or by foot, or both, into the soil, as in FIGURE 1, a plug P of the size of the entrance 2 pushes up into its interior, and breaks off within the hopper as the perforator is lifted. The surrounding soil is somewhat compressed, the least so near the bottom of the hole where fertilizer and moisture should percolate into the lawn. The hole is of a size and shape that it tends to remain open for a long period of time. The foot that presses the cone downwardly covers the open upper end, at 3, and prevents spilling of collected soil during any abrupt downward thrusts of the tool. Another benefit derivable from use of the tool is the removal of weeds and weed roots such as dandelions, in the act of perforating the soil. It is found that these weed roots are efficiently removed and in so doing the surrounding sod permitted to reestablish itself from the resultant aeration thus afforded by removing the plug of soil with the weed root.

Being made of rather light gauge sheet steel, the tool as a whole is quite light and inexpensive, yet is adequately form-sustaining because of its conical shape and the reinforcing bead 3 at its top.

While the dimensions, taper, and sheet metal gauge have been described with some particularity, since these were arrived at as optimum after rather considerable experimentation, it will be understood that some departure from the figures given by way of example is possible.

The perforator has been described as a hand tool, with a single head and usually will be so made. However, it will be recognized that the novel principles involved may be applied in ways varying from the disclosed embodiment without departing from the invention as hereinafter claimed.

I claim as my invention:
1. A lawn perforator comprising an elongated hollow cone frustum, its larger end lying in a plane substantially perpendicular to its axis, and its smaller end lying in a plane inclined with respect to its axis, and its larger end being several times the diameter of its smaller end, and a handle secured to said cone substantially in alignment with the line that defines its shortest distance between larger and shorter ends, and extending upwardly from its larger end, for guiding its smaller and lower end downwardly into the earth to lift a plurality of successive plugs each of the diameter of the smaller, lower end.

2. A lawn perforator as in claim 1, wherein the larger upper end of the cone is formed with a reinforcing bead lying substantially horizontally in use, to receive foot pressure to force the lower end into the ground.

3. A lawn perforator as in claim 1, wherein the cone angle is of the order of 18°, and the axial length of the cone is of the order of one foot.

References Cited by the Examiner
UNITED STATES PATENTS

| | | | |
|---|---|---|---|
| 536,895 | 4/1895 | Richards | 294—50.7 X |
| 1,053,148 | 2/1913 | Billow | 294—50.7 |
| 1,572,431 | 2/1926 | Hensen | 294—50.7 |

GERALD M. FORLENZA, *Primary Examiner.*

SAMUEL F. COLEMAN, *Examiner.*